United States Patent
Eun et al.

(10) Patent No.: US 7,426,887 B2
(45) Date of Patent: Sep. 23, 2008

(54) APPARATUS FOR FABRICATING COLOR FILTER OF LCD

(75) Inventors: Chong Chan Eun, Pajoo-si (KR); Jun Young Yu, Pajoo-si (KR)

(73) Assignee: LG Display Co., Ltd., Seoul (KR)

( * ) Notice: Subject to any disclaimer, the term of this patent is extended or adjusted under 35 U.S.C. 154(b) by 336 days.

(21) Appl. No.: 11/153,997

(22) Filed: Jun. 16, 2005

(65) Prior Publication Data

US 2006/0000379 A1    Jan. 5, 2006

(30) Foreign Application Priority Data

Jun. 30, 2004   (KR) .................... 10-2004-0050835

(51) Int. Cl.
*B41F 17/00* (2006.01)

(52) U.S. Cl. .................. 101/483; 438/30; 438/70

(58) Field of Classification Search .............. None
See application file for complete search history.

(56) References Cited

U.S. PATENT DOCUMENTS

| | | | |
|---|---|---|---|
| 5,533,447 A * | 7/1996 | Johnson et al. ............. | 101/211 |
| 6,376,271 B1 | 4/2002 | Sawayama et al. | |
| 2002/0126247 A1 | 9/2002 | Hasegawa et al. | |
| 2005/0126410 A1 * | 6/2005 | Won et al. ................... | 101/359 |

FOREIGN PATENT DOCUMENTS

| | | |
|---|---|---|
| EP | 0 402 942 | 12/1990 |
| EP | 1 333 315 | 8/2003 |
| JP | 62280804 | 12/1987 |
| JP | 08136712 | 5/1996 |
| JP | 08-220336 | 3/1997 |
| JP | 09-080215 | 3/1997 |
| JP | 2002122849 | 4/2002 |
| WO | 95/12494 | 5/1995 |

OTHER PUBLICATIONS

Combined search and examination report dated Feb. 22, 2006 for corresponding French Application No. 0506380000.
Office Action dated Feb. 1, 2007 for corresponding German Patent Application No. 10 2005 030 452.4-51.

* cited by examiner

*Primary Examiner*—Jill E. Culler
(74) *Attorney, Agent, or Firm*—Brinks Hofer Gilson & Lione

(57) ABSTRACT

An apparatus and method for fabricating a color filter of an LCD is provided. A first roller includes a dry film and a base film that are formed around the first roller in a predetermined order, the dry film is a red, a green, or a blue dry film to form a sub-color filter, the base film protects the dry film. A second roller operates in connection with the first roller and includes the dry film and the base film that are formed around the second roller in a reverse order of the predetermined order. A printing plate forms a predetermined pattern on the dry film formed around the second roller.

8 Claims, 5 Drawing Sheets

APPARATUS FOR FABRICATING COLOR FILTER OF LCD

This application claims the benefit of priority to Korean patent application No.: 2004-50835, which was filed on Jun. 30, 2004, and is incorporated herein by reference.

TECHNICAL FIELD

The present application relates to a liquid crystal display (LCD), and more particularly, to an apparatus and method for fabricating an LCD color filter.

BACKGROUND

With the rapid development of information technology, demand for improved flat panel displays is surging. To satisfy such a demand, flat panel displays such as slim, light-weight, and low power consuming flat panel displays are being developed. Particularly, LCDs with improved features such as high resolution, color illuminating accuracy, and image quality are being developed and applied to various devices such as notebook computers and desktop computers.

Generally, an LCD includes a lower array substrate having pixel electrodes on one side, an upper color filter substrate having common electrodes facing the pixel electrodes, and liquid crystal filled between the lower array substrate and the upper color filter substrate. When a voltage is applied between the pixel electrode and the common electrode, an electric field is generated in the liquid crystal to change the arrangement of the liquid crystal molecules and thereby change the light transmittance. The LCD displays images by utilizing the change in the light transmittance of the liquid crystal.

In detail, FIG. 1 shows a partial sectional view of an LCD according to the related art, in which, for clarity reasons, only one common electrode, only one pixel electrode corresponding to the common electrode, and liquid crystal filled between the common electrode and the pixel electrode are illustrated.

Referring to FIG. 1, an LCD includes a lower array substrate 10 having a pixel electrode 26, a thin film transistor (T) corresponding to the pixel electrode 26, and a transparent first substrate 5a. The thin film transistor (T) is formed on the first substrate 5a and it includes a gate electrode 12, an active layer 16, ohmic contact layers 18a and 18b, a source electrode 20a, and a drain electrode 20b. Though not shown, the gate electrode 12 and the source electrode 20a are respectively connected to a gate line and a data line that cross at right angles to each other to define a pixel region.

The pixel electrode 26 is made of transparent conductive material and it is formed at the pixel region. Also, the pixel electrode 26 is electrically connected to the drain electrode 20b of the thin film transistor (T) through a contact hole 24.

Reference numerals 14 and 22 denote an insulating layer and a passivation layer, respectively. The insulating layer 14 is formed to insulate the gate electrode 12, and the passivation layer 22 is formed to protect the thin film transistor (T).

Further, the LCD includes an upper color filter substrate 50 facing the lower array substrate 10 and a liquid crystal 30 filled between the upper color filter substrate 50 and the lower array substrate 10. The upper color filter substrate 50 includes a transparent second substrate 5b spaced apart from the first substrate 5a, an opening defined under the second substrate 5b to face the pixel electrode 26, and a black matrix 52 formed under the second substrate 5b to face the thin film transistor (T). The black matrix 52 prevents light from passing therethrough, such that light from the pixel electrode 26 can pass through the upper color filter substrate 50 while light from other portions cannot pass through the upper color filter substrate 50.

Further, the upper color filter substrate 50 includes a color filter 54, an overcoat layer 56, and a common electrode 58. The color filter 54 is formed beside the black matrix 52 at a position corresponding to the pixel electrode 26 of the lower array substrate 10 to produce color. The overcoat layer 56 is formed below the color filter 54 to protect the color filter 54 and smooth the uneven surface, and the common electrode 58 is formed on the overcoat layer 56 with a transparent conductive material.

Since the LCD itself does not have a light emitting component, a backlight unit (not shown) is provided behind the LCD as a light source. Therefore, the LCD can display various images by changing the molecular arrangement of the liquid crystal 30 when the backlight unit emits light toward the liquid crystal 30.

To display color images with the LCD, the color filter 54 is included in the LCD as a component. Referring to FIG. 2, the color filter 54 includes repeatedly arranged red, green, and blue sub-color filters 54a, 54b, and 54c, each allowing light having a corresponding wavelength to pass therethrough. By adjusting the amount of the red, green, and blue colors, an accurate color reproduction can be obtained through a combination of the three colors.

Though the structural relationship between the black matrix 52 and the color filter 54 is changed in FIG. 2 when compared with FIG. 1, this change will be understood by persons of skill in the art as an obvious change.

Pigment dispersion, dyeing, and electro-deposition are usually used to form a color filter. In a typical pigment dispersion method, a substrate is coated with resin containing a dispersed polyamide pigment and then a pattern is formed on the coated substrate using photolithography. The pigment dispersion method is widely used since it provides an increased processing margin, and higher heat-resisting and light-resisting characteristics. Particularly, the pigment dispersion method is useful for large LCDs.

However, the pigment dispersion method is disadvantageous in that the coating and photolithography operations are successively carried out to form the red, green, and blue sub-color filters, thereby complicating the manufacturing process. Also, it increases the cost due to expensive manufacturing equipment.

FIG. 3 is a schematic sectional view of a photosensitive sheet used as a dry film for a thin-film coating method according to the related art. Referring to FIG. 3, a photosensitive sheet 60 includes a cover film 62, a color photosensitive layer 64, an oxygen barrier layer 66, a cushion layer 68, a base film 69, and an anti-static layer 70 that are sequentially formed in this order. The anti-static layer 70 is provided to eliminate static electricity.

The cover film 62 and the base film 69 are provided to protect the cushion layer 68, the oxygen layer 66, and the color photosensitive layer 64 from impact, dust and the like. The cover film 62 and the base film 69 will be removed after a color filter is formed using the photosensitive sheet 60. Depending on the pigment contained in the color photosensitive layer 64, the photosensitive sheet 60 can be used for fabricating a red sub-color filter, a green sub-color filter, or a blue sub-color filter.

The color photosensitive layer 64 includes a photopolymerization type photosensitive composition, which contains an organic pigment (for a red, a green, or a blue), a binder, a photopolymerization initiator, and a functionality monomer. During a color filter fabricating process, the photosensitive layer 64 is attached to a substrate and becomes a red, a green, or a blue sub-color filter by a selectively scanned light. When a color filter is sequentially formed using red, green, and blue photoconductive sheets, the cushion layer 68 moderates the unevenness of the previously formed sub-color filter and facilitates the attachment of the next photosensitive sheet to the substrate. For this purpose, the cushion layer 68 is made of flexible, transparent material.

The oxygen barrier layer 66 preserves the photosensitivity of the color photosensitive layer 64 and prevents a light-exposed portion of the photosensitive layer 64 from dispersing.

When compared with other methods such as a pigment dispersion method, the thin film coating method of fabricating the color filter with the photosensitive sheet is advantageous to simplify the process and the manufacturing equipment. In the thin film coating method, however, chemical solutions such as a stripping solution and a developing solution are repeatedly applied to remove residual cushion and color photosensitive layers of the previously formed sub-color filter, thereby complicating the process and impacting the previously formed sub-color filter.

SUMMARY

An apparatus and method of fabricating a color filter of an LCD is described, in which a predetermined pattern is formed on a dry film without using a photolithography and the patterned dry film is printed on a color filter substrate.

An apparatus for fabricating a color filter A liquid crystal display (LCD) includes a first roller around which a dry film and a base film are formed in a predetermined order, the dry film being a red, a green, or a blue dry film to form a sub-color filter, the base film protecting the dry film; a second roller around which the dry film and the base film are formed in a reverse order of the predetermined order, for an operation in connection with the first roller; and a printing plate to form a predetermined pattern on the dry film formed around the second roller.

A method of fabricating a color filter of an LCD includes preparing a first roller and a second roller operating in connection with the first roller, the first roller including a dry film and a base film that are formed around the first roller in a predetermined order, the dry film being a red, a green, or a blue dry film, the base film protecting the dry film, the second roller including the dry film and the base film that are formed around the second roller in a reverse order of the predetermined order; forming a predetermined pattern on the dry film formed around the second roller by operating the first and the second rollers to roll the second roller on a printing plate on which a corresponding pattern is formed; and operating the first and the second rollers to print the patterned dry film on a color filter substrate to form a color filter.

DETAILED DESCRIPTION

Exemplary embodiments may be better understood with reference to the drawings, but these examples are not intended to be of a limiting nature. Like numbered elements in the same or different drawings perform equivalent functions.

A color filter fabricating method utilizing a dry film makes a color filter with inexpensive equipment and a simple process. The dry film method requires inexpensive equipment but provides higher reliability and thereby it can be applied to various fields. The color filter is fabricated by printing a predetermined pattern with a roller around which a dry film is formed.

Figure 1:
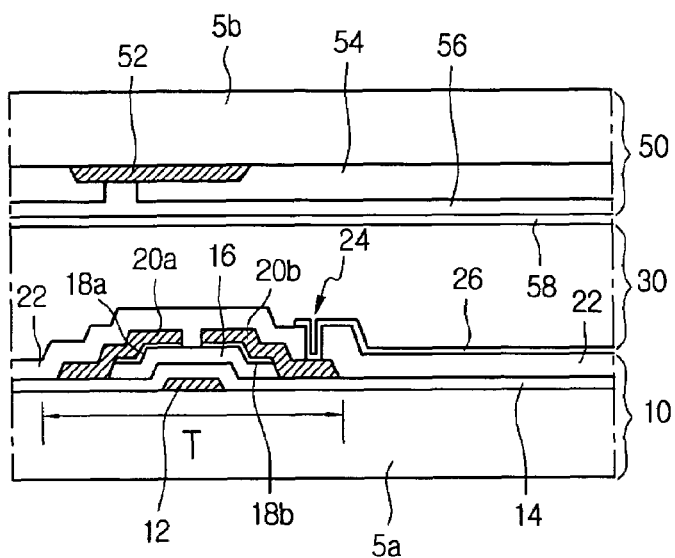
FIG. 1 is a partial sectional view of an LCD according to the related art.
Figure 2:
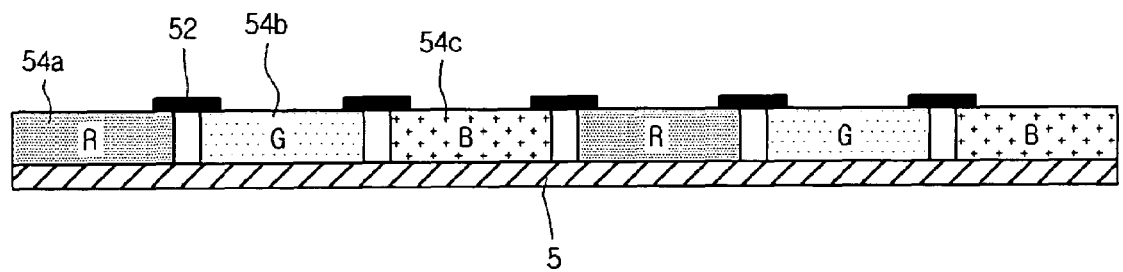
FIG. 2 is a sectional view of a color filter substrate of an LCD according to the related art.
Figure 3:
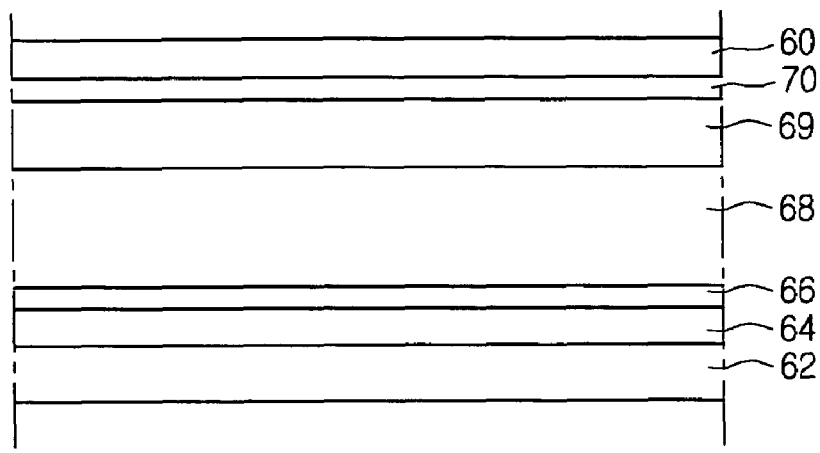
FIG. 3 is a schematic sectional view of a photosensitive sheet used as a dry film for a thin-film coating method according to the related art.
Figure 4:
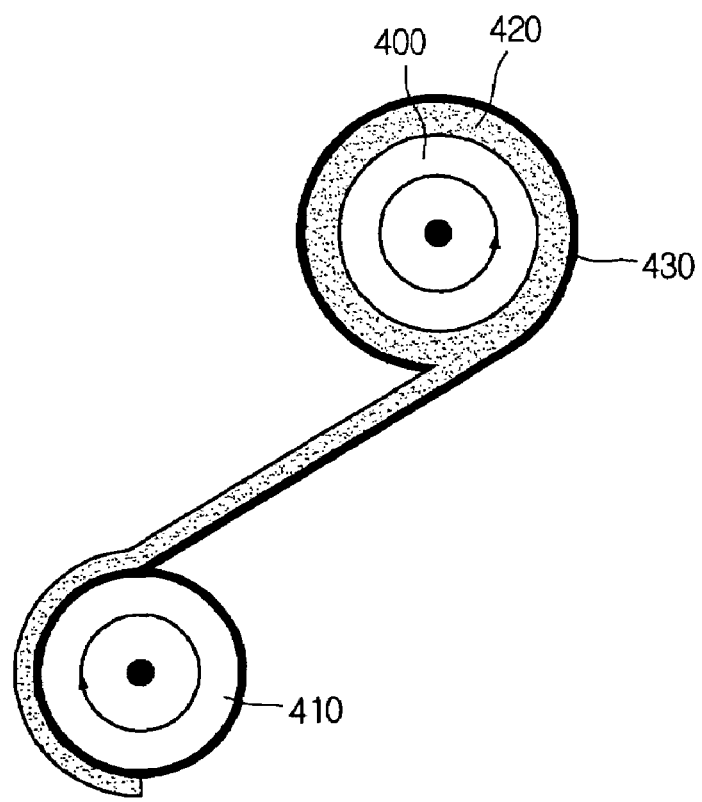
FIG. 4 is a schematic sectional view of an apparatus for fabricating a color filter.

Referring to FIG. 4, a color filter fabricating apparatus includes a first roller 400, a second roller 410 for an operation in connection with the first roller 400, and a printing plate (not shown). A dry film 420 and a base film 430 are formed around the first roller 400, in a predetermined order, and the dry film 420 and the base film 430 are also formed around the second roller 410 in the reverse order of the predetermined order. The dry film 420 is a red, a green, or a blue dry film to form a sub-color filter. The printing plate is provided to form a predetermined pattern on the dry film 420 formed around the second roller 410.

The dry film 420 and the base film 430 are sequentially formed around the first roller 400. The base film 430 and the dry film 420 are sequentially formed in the reverse order around the second roller 410. Also, the first roller 400 and the second roller 410 are connected by the base film 430 and the dry film 420.

Therefore, when the first roller 400 is rotated, the second roller 410 is also rotated in a corresponding direction. In FIG. 4, for example, the first roller 400 is rotated counterclockwise to rotate the second roller 410 clockwise.

A predetermined pattern is formed on the dry film 420 of the second roller 410 and then the dry film 420 is printed on a color filter substrate.

The predetermined pattern is formed on the dry film 420 of the second roller 410 by rolling the second roller 410 on the printing plate on which a pattern corresponding to the predetermined pattern is formed.

The dry film 420 may be used to form a red, a green, or a blue sub-color filter depending on the pigment contained therein. That is, the dry film 420 includes a binder and an organic pigment for a red, a green, or a blue color.

Since a predetermined pattern is printed on the dry film 420 using the printing plate, the dry film 420 is made of material suitable for the patterning.

Figure 5A:
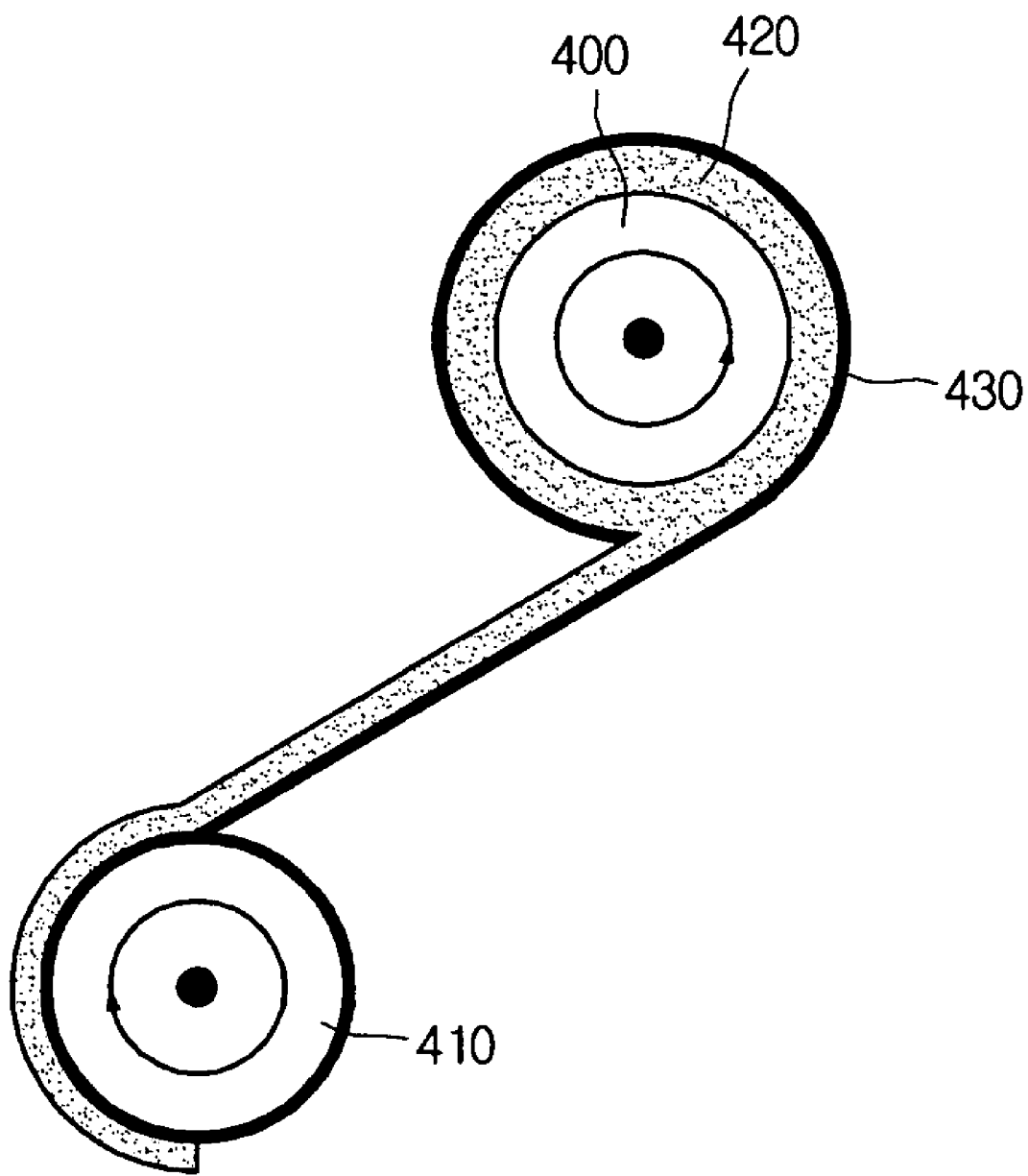
FIGS. 5A to 5C schematically show a method of fabricating a color filter of an LCD.
Figure 5B:
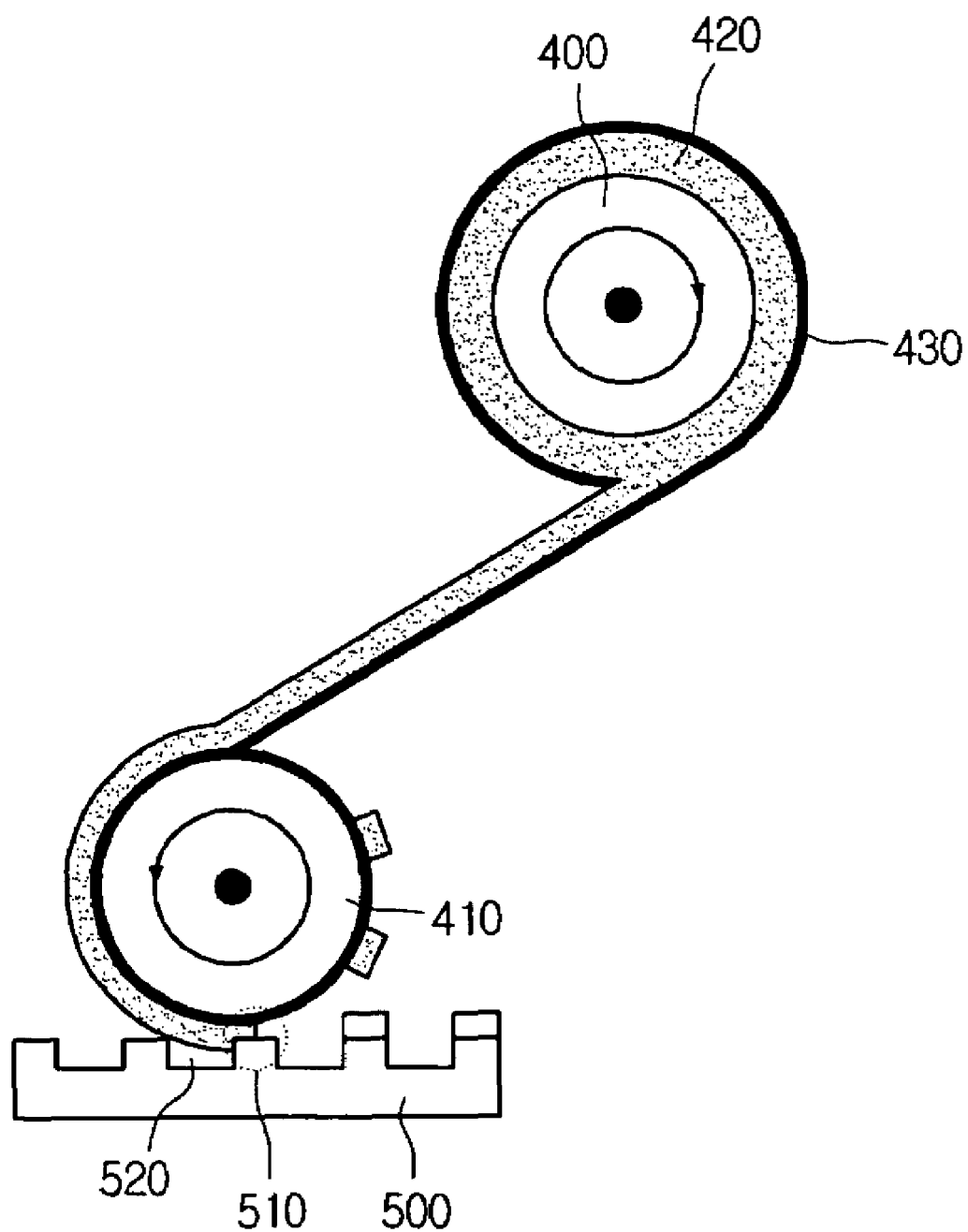
Figure 5C:
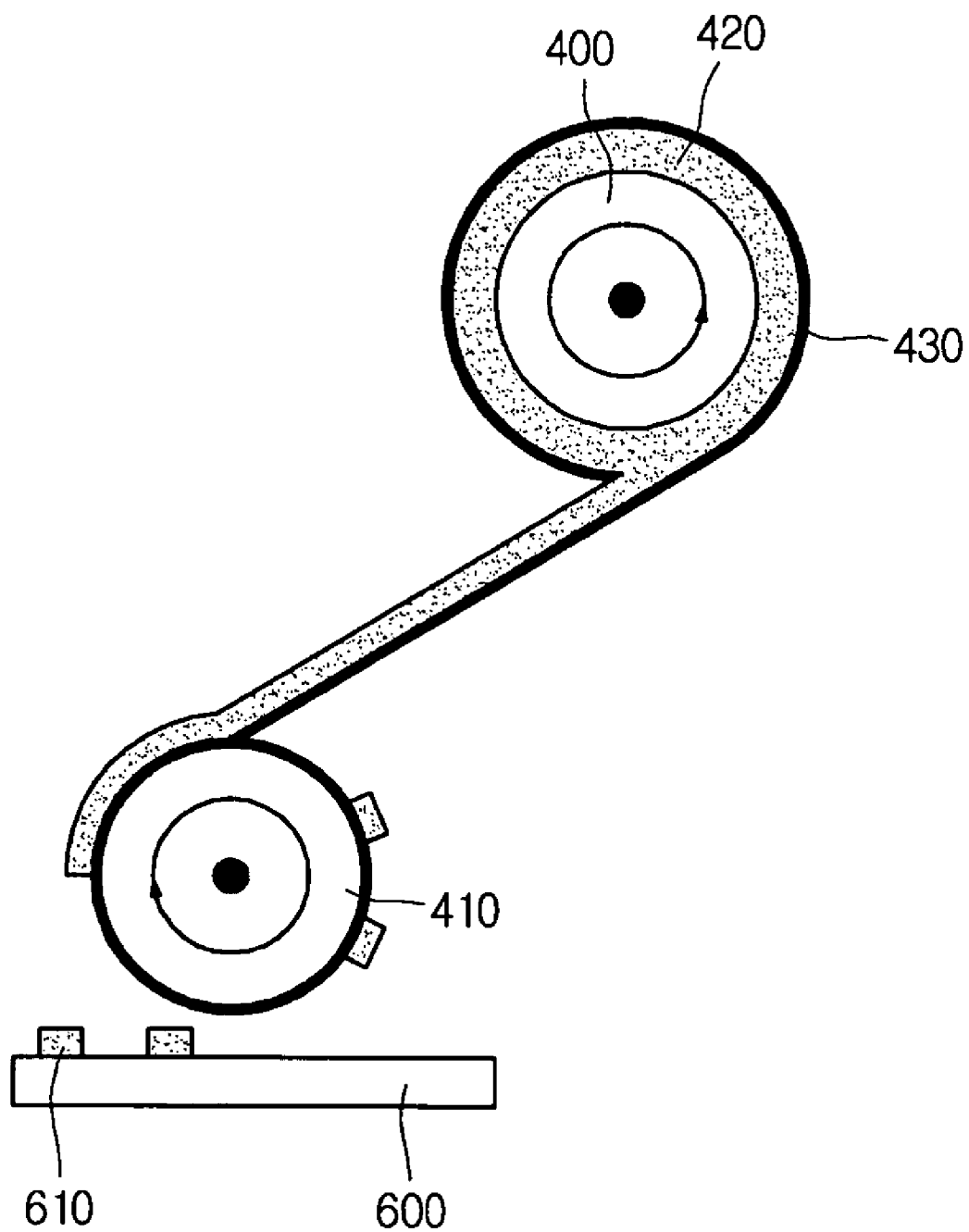

FIGS. 5A to 5C schematically show a method of fabricating a color filter of an LCD In FIG. 5A, an apparatus is prepared for a method of fabricating a color filter. The color filter fabricating apparatus includes the first roller 400 around which the dry film 420 and the base film 430 are formed in a predetermined order, wherein the dry film 420 is a red, a green, or a blue dry film to form a sub-color filter, and the base film 430 is provided to protect the dry film 420. Also, the apparatus includes the second roller 410 around which the dry film 420 and the base film 430 are formed in the reverse order of the predetermined order, for an operation in connection with the first roller 400.

Referring to FIG. 5B, the first roller 400 and the second roller 410 are operated to roll the second roller 410 on a printing plate 500 where a predetermined pattern is formed.

The predetermined pattern of the printing plate 500 includes depressed portions 520 and raised portions 510. The predetermined pattern corresponds to a color filter pattern to be formed on a color filter substrate.

As shown in FIG. 5B, while the second roller 410 rolls on the printing plate 500, the printing plate 500 forms a pattern on the dry film 420 formed around the second roller 410.

Referring to FIG. 5C, after the pattern is formed on the dry film 420 of the second roller 410, the patterned dry film 420 is transferred onto a color filter substrate 600 to form a pattern 610.

To transfer the patterned dry film 420 to the color filter substrate 600, the second roller 410 is reversibly rotated when compared with FIG. 5B. That is, the rotational direction of roller 410 shown in FIG. 5C is opposite to that shown in FIG. 5B.

As described above, a predetermined pattern is formed on the dry film 420 without using a photolithography, and then the patterned dry film is transferred to the color filter substrate 600.

Although the present invention has been explained by way of the examples described above, it should be understood to the ordinary skilled person in the art that the invention is not limited to the examples, but rather that various changes or modifications thereof are possible without departing from the spirit of the invention. Accordingly, the scope of the invention shall be determined only by the appended claims and their equivalents.

What is claimed is:

1. An apparatus for fabricating a color filter of a liquid crystal display (LCD), comprising:
   a first roller around which a dry film and a base film are formed;
   a second roller around which the dry film and a base film are formed; and
   a printing plate to form a predetermined pattern on the dry film formed around the second roller,
   wherein the dry film is a red, a green, or a blue dry film,
   wherein the second roller rolls on the printing plate to form the predetermined pattern.

2. The apparatus according to claim 1, wherein the dry film and the base film are formed in a first sequence around the first roller.

3. The apparatus according to claim 2, wherein the dry film and the base film are formed in a second sequence around the second roller, and wherein the second sequence is the reverse of the first sequence.

4. The apparatus according to claim 1, wherein the first roller and the second roller are connected by the base film and the dry film.

5. The apparatus according to claim 1, wherein the second roller is rotated by the rotation of the first roller.

6. The apparatus according to claim 1, wherein after the predetermined pattern is formed on the dry film formed around the second roller, the patterned dry film is printed on a color filter substrate to fabricate a color filter.

7. The apparatus according to claim 6, wherein the second roller rolls reversely for printing the patterned dry film, compared to forming the predetermined pattern.

8. The apparatus according to claim 1, wherein the dry film includes a binder and an organic pigment for red, a green, or a blue color.

* * * * *